US012762475B2

(12) United States Patent
Langford

(10) Patent No.: US 12,762,475 B2
(45) Date of Patent: Oct. 13, 2026

(54) SYSTEMS AND METHODS FOR BAGGING ENSEMBLE CLASSIFIERS FOR IMBALANCED BIG DATA

(71) Applicant: Capital One Services, LLC, McLean, VA (US)

(72) Inventor: Michael Langford, Plano, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 846 days.

(21) Appl. No.: 18/060,749

(22) Filed: Dec. 1, 2022

(65) Prior Publication Data

US 2024/0185116 A1 Jun. 6, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
USPC ............................................................ 706/12
See application file for complete search history.

(56) References Cited

U.S. PATENT DOCUMENTS 11,182,691 B1 * 11/2021 Zhang .................... G06N 20/20
2019/0043070 A1 * 2/2019 Merrill ...................... G06F 9/54
2023/0141749 A1 * 5/2023 Hao ......................... G06N 3/09 714/47.3
2023/0186092 A1 * 6/2023 Natsui ................... G06N 3/082 706/25

* cited by examiner

*Primary Examiner* — Raquel Perez-Arroyo
(74) *Attorney, Agent, or Firm* — TROUTMAN PEPPER LOCKE LLP; Christopher J. Forstner; John A. Morrissett

(57) ABSTRACT

Disclosed embodiments may include a method for bagging ensemble classifiers for imbalanced big data. The system may receive user input comprising a number of machine learning base models to generate. The system may generate the machine learning base models based on the user input. Iteratively for each machine learning base model of the machine learning base models until all machine learning base models are trained, the system may: determine a chunk for a machine learning base model of the machine learning base models, wherein the chunk comprises all minority cases from training data and a plurality of majority cases from the training data and train the machine learning base model with the chunk.

20 Claims, 3 Drawing Sheets

SYSTEMS AND METHODS FOR BAGGING ENSEMBLE CLASSIFIERS FOR IMBALANCED BIG DATA

FIELD

The disclosed technology relates to systems and methods for bagging ensemble classifiers for imbalanced big data. Specifically, this disclosed technology relates using a reconfigured large imbalanced training dataset to train an ensemble of base models to perform effective classifications despite the imbalanced nature of the original training dataset.

BACKGROUND

Machine learning classification models are typically trained using training datasets having data of known classifications that can be used to iteratively improve the model. Datasets used to train machine learning classification models can be very large, such that a large amount of processing power may be required to load all of the data for training purposes. In such cases, training of a machine learning model may require the use of expensive external computing resources, such as cloud-based resources that can provide much greater processing power. Further, in some instances, large datasets may be very imbalanced (e.g., only a 100 out of 100,000 transactions of a training dataset may represent fraudulent transactions), which can present difficulties in training a machine learning classification model to recognize classes that are not well-represented in the training data.

Accordingly, there is a need for improved systems and methods of effectively processing training data to reduce computational resources needed to train machine learning classification models and improve the accuracy of the results of such models in the case of imbalanced training data. Embodiments of the present disclosure are directed to this and other considerations.

SUMMARY

Disclosed embodiments may include a system for bagging ensemble classifiers for imbalanced big data. The system may include one or more processors, and memory in communication with the one or more processors and storing instructions that, when executed by the one or more processors, are configured to cause the system to generate a number of machine learning base models for classifying an imbalanced dataset. The system may receive a first dataset. The system may store a minority portion of the first dataset as testing data with the remaining first data as training data. The system may separate the training data into majority cases and minority cases. The system may receive user input comprising a number of machine learning base models to generate. The system may generate the machine learning base models based on the user input. Iteratively for each machine learning base model of the machine learning base models until all machine learning base models are trained, the system may: determine a chunk for a machine learning base model of the machine learning base models, wherein the chunk comprises all minority cases from the training data and a plurality of majority cases from the training data and train the machine learning base model with the chunk. The system may validate the machine learning base models using the testing data.

Disclosed embodiments may include a system for bagging ensemble classifiers for imbalanced big data. The system may include one or more processors, and memory in communication with the one or more processors and storing instructions that, when executed by the one or more processors, are configured to cause the system to generate a number of machine learning base models for classifying an imbalanced dataset. The system may receive user input comprising a number of machine learning base models to generate. The system may generate the machine learning base models based on the user input. Iteratively for each machine learning base model of the machine learning base models until all machine learning base models are trained, the system may: determine a chunk for a machine learning base model of the machine learning base models, wherein the chunk comprises all minority cases from training data and a plurality of majority cases from the training data and train the machine learning base model with the chunk.

Disclosed embodiments may include a system for bagging ensemble classifiers for imbalanced big data. The system may include one or more processors, and memory in communication with the one or more processors and storing instructions that, when executed by the one or more processors, are configured to cause the system to generate a number of machine learning base models for classifying an imbalanced dataset. The system may receive training data separated into majority cases and minority cases. The system may generate machine learning base models based on an amount of majority cases and minority cases. Iteratively for each machine learning base model of the machine learning base models until all machine learning base models are trained, the system may: determine a chunk for a machine learning base model of the machine learning base models, wherein the chunk comprises all minority cases from the training data and a plurality of majority cases from the training data and train the machine learning base model with the chunk.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
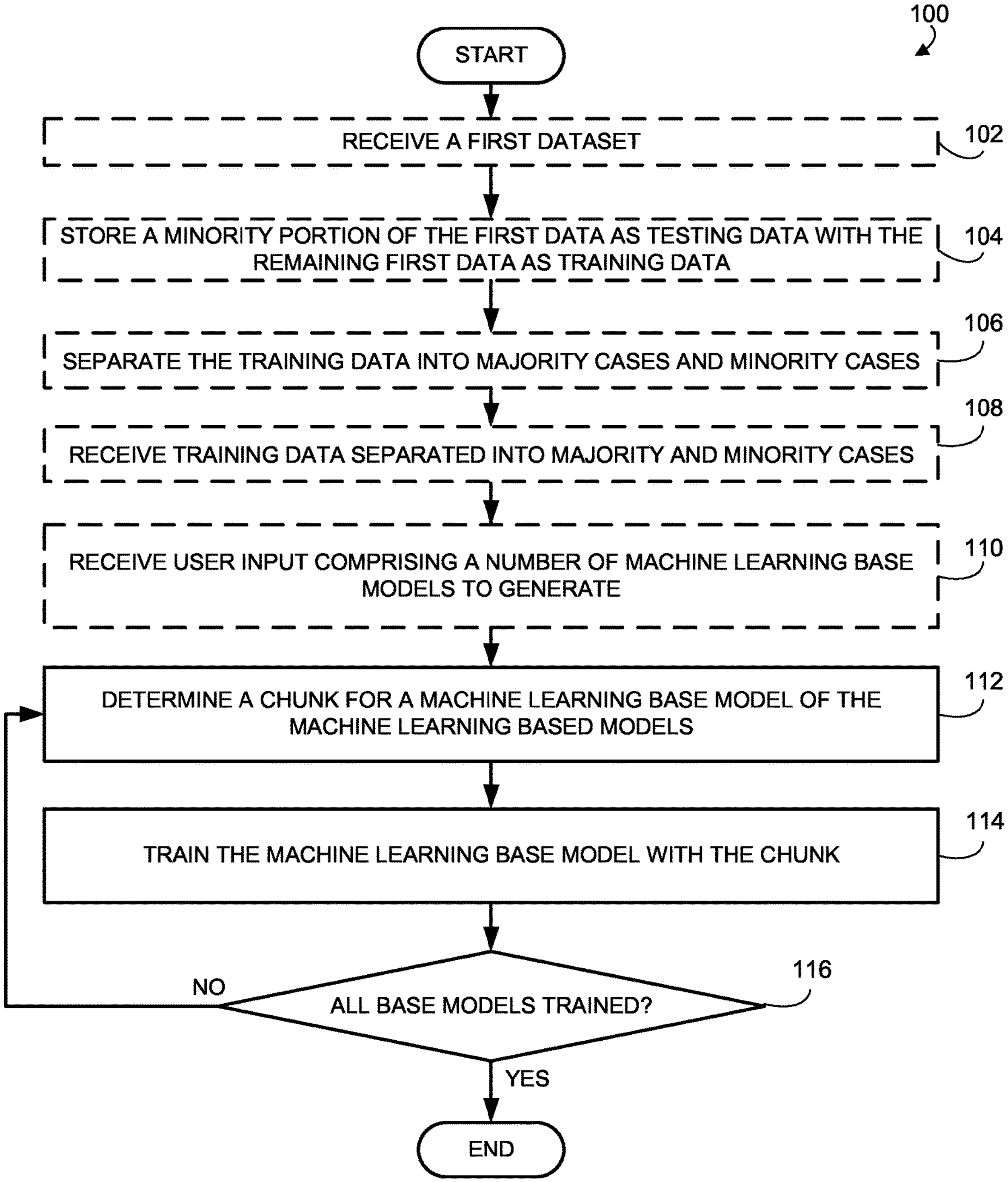
FIG. 1 is a flow diagram illustrating an exemplary method for bagging ensemble classifiers for imbalanced big data in accordance with certain embodiments of the disclosed technology.

Imbalanced datasets used to train machine learning models can commonly create problems because the class imbalance creates difficulty for the training model to identify observations from the minority class. For example, it may be desirable to train a model to predict whether a given financial transaction is fraudulent or not and the model may be trained based on a historical dataset of transactions. However, because the vast majority of transactions are not fraudulent, 99% of the training dataset may represent legitimate transactions with only 1% of the training dataset representing fraudulent transactions. Such a large imbalance in the training data can make it difficult for the trained model to identify fraudulent cases. Further, because such datasets can be very large, it is typical that a personal computing device such as a laptop would not be able to load all of the data for use in training a model. Thus, to train a model using such a dataset it may be necessary to employ a large amount of computing resources, such as distributed cloud computing resources, which are expensive and require a great amount of computing power. Accordingly, embodiments of the present disclosure may provide systems and methods to train effective classification models using large imbalanced datasets on a local computer with more limited computing resources, such as an individual's desktop computer.

Examples of the present disclosure related to systems and methods for bagging ensemble classifiers for imbalanced big data. More particularly, the disclosed technology relates to reconfiguring a large imbalanced dataset for use in training and validating an ensemble of machine learning base models for the purpose of performing classifications.

The systems and methods described herein utilize machine learning models, which are necessarily rooted in computers and technology. Machine learning models are a unique computer technology that involves training models to complete tasks and make decisions. The present disclosure details systems and methods for determining different chunks of data of a large imbalanced dataset to be used in training different base models of an ensemble classifier model and using a subset of the original data to validate each base model of the ensemble. Each base model may be a machine learning classification model that can be used to classify new data by submitting the new data to each base model of the ensemble and then aggregating the results into a final classification output. The process of determining allocations of the original dataset for use in the training and validation of an ensemble of base models as described herein may allow the system to create a machine learning classifier (i.e., an ensemble classifier) using all of the data of the original dataset using a personal device such as a laptop or desktop computer. Absent the techniques described herein, this may otherwise be impossible or impractical, as the typical personal computing device does not have the internal memory to load and process the entirety of a large dataset. Thus, the techniques disclosed herein solve the technical problem of training a machine learning classifier model based on a large dataset using a personal computing device.

Further, other techniques that may be used to reduce the dataset for processing present problems to the accuracy and effectiveness of the resulting classification model because they may eliminate portions of the data from training and testing, thereby losing the insights that may have been provided by those portions of data. The techniques disclosed herein may utilize all of the data of the large training dataset such that no information is lost. Further, other methods may pare down training data in a manner that may nonetheless still reflect a large imbalance in the training data, so even if you could use those methods to train a machine learning classifier model using a personal computing device, the model may suffer from problems of efficacy, due to the imbalanced data used to train it. The techniques described herein provide a solution to all of these problems, which may result in a reduction of the computing resources needed to train the classifier model, the speed at which the training of the model(s) may occur and improvements to the accuracy of the predictions made by the classification model that may have otherwise been affected or skewed by the imbalanced training data. Overall, the systems and methods disclosed have significant practical applications in the machine learning field because of the noteworthy improvements of the training system disclosed herein, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for bagging ensemble classifiers for imbalanced big data, in accordance with certain embodiments of the disclosed technology. The steps of method 100 may be performed by one or more components of the system 300 (e.g., training system 220 or user device 302), as described in more detail with respect to FIGS. 2 and 3.

In block 102, the training system 220 may optionally receive a first dataset. The first dataset may be a dataset that may be large and imbalanced. According to some embodiments, a large dataset may be a dataset that is more than 16 gigabytes of data. An imbalanced dataset may be a dataset in which a large majority of the dataset is of one classification type. For example, the dataset may be data relating to 100,000 previous financial transactions, where 99% of the data relates to legitimate transactions (which may be referred to as "majority cases") and 1% of the data relates to fraudulent cases (which may be referred to as "minority cases").

In some embodiments, the term "majority cases" may refer to cases within a set of cases (e.g., such as a training dataset) that are of a class that represents more than 50% of the set of cases, whereas "minority cases" are cases of a class that represents less than 50% of the set of cases. For example, if there is a dataset that represents 100 animals in which 60 of the animals are classified as dogs and 40 of the animals are classified as cats, then the data related to each instance of a dog (i.e., each case of a dog) may be considered to be a majority case, whereas the data related to each instance of a cat may be considered to be a minority case. In some embodiments, the term "majority cases" may refer to a particular class of cases within a dataset that occurs more frequently within the dataset than any other class and "minority cases" may refer to a class of cases that occurs the least frequently in the dataset. For example, if a dataset represents 100 animals in which 45 of the animals are dogs, 25 of the animals are cats, 20 of the animals are birds and 10 of the animals are rabbits, then dogs may be the majority cases and rabbits may be the minority cases. According to some embodiments in which there are more than two classes, the majority cases may be considered to be all classes other than the least common class. Thus, in the previous example, the majority cases may be considered to be all of the cases of dogs, cats and birds collectively, while the minority cases may be considered to be the cases of birds. According to some embodiments, the majority cases may be considered to be one or more classes that either alone or collectively represent more than a first threshold percentage of the total cases of the dataset. According to some embodiments, the first threshold percentage may be any percentage (e.g., as determined by a user of the system or as set as a default by the system) between 50% and 99.9%. In some embodiments, the minority cases may be considered to be one or more classes that either alone or collectively represent less than a second threshold percentage of the total cases of the dataset. According to some embodiments, the second threshold percentage may be any percentage (e.g., as determined by a user system or as set as a default by the system) between 49.9% and 0%.

According to some embodiments, an imbalanced dataset may be a dataset in which 90% or more of the datapoints are of a single classification type. In some instances, more than two classification types may exist in the data. According to some embodiments, in cases where more than two classification types exist, an imbalanced dataset may be considered to be a dataset in which the most common class has a ratio of at least 10:1 when compared to the least common class. It should be understood that these are merely examples, and in various embodiments a different threshold percentage (e.g., any percentage between 51% and 99%) or ratio can be used to define whether a dataset is an imbalanced dataset.

In block 104, the training system 220 may optionally store a minority portion of the first dataset as testing data with the remaining first data as training data. In other words, the training system 220 may take the received first dataset and separate it into a minority portion to be later used to test base models the training system 220 is going to create and train using the remaining portion of the first data. According to some embodiments, the user may specify what portion (e.g., what percentage) of the first data should be reserved as testing data and what portion of the data is to be used for training data. In some embodiments, the minority portion (i.e., the portion to be used as testing data) may be 10 to 30% of the first dataset. According to some embodiments, the minority portion of the data to be used in testing the base models will include some minority cases so that it can be determined whether each based model tested can appropriately classify one or more minority cases. The minority portion (i.e., the testing data) can be input into each of the trained base models and their predication/classification outputs can be aggregated to generate an ensemble prediction/classification to determine whether the ensemble of base models can make predictions/classifications at a minimum desired level of accuracy. According to some embodiments, the step of separating/storing a minority portion of the first dataset as testing data can occur after the data is split into chunks as described below in block 112. Further, in some embodiments, the first dataset may have been separated into majority and minority cases (as described below in blocks 106 or 108) prior to storing or identifying a minority portion of the first data as being testing data and the remaining first data as being training data.

In block 106, the training system 220 may optionally separate the training data into majority cases and minority cases. In other words, the training system 220 may identify a classification of "majority" or "minority" that is associated with each case of the training data. As will be appreciated by those of skill in the art, the training data may be labeled such that each case is already labeled as a majority or minority case, and thus the training system 220 may simply identify which cases are majority cases and which cases are minority cases based on the labeling of the dataset. According to some embodiments, the training system 220 may do this as a part of separating all of the first dataset into majority cases and minority cases, such that data stored as a minority portion of the first dataset as testing data is also identified/labeled as majority cases and minority cases.

In block 108, the training system 220 receive training data separated into majority cases and minority cases. In other words, in some embodiments, the training data set may be labeled when it is received such that each case represented by the data is already known to be a majority case or a minority case. According to some embodiments, the entire first dataset may be labeled when it is received, such that each case represented by data of both the training data and testing data are already known to be either a majority case or a minority case.

In block 110, the training system 220 may optionally receive user input indicating a number of machine learning base models to generate. According to some embodiments, the training system 220 may determine a number of machine learning base models to generate based on the user input. For example, the user may input a number of base models (e.g., "100") that the training system 220 will create.

In some embodiments, the user input may specify the type(s) of machine learning classification base models to be generated by the training system 220. Thus, for example, in some embodiments, the user input may include a selection of a logistic regression model, a gradient boosted tree method model, or a k-nearest neighbor model According to some embodiments, the training system 220 may generate the machine learning base models based on the user input. In other words, in some embodiments, the type and/or number of machine learning base models may be input or selected by a user and the training system 220 may generate the specified number of base models of the specified type(s). For example, a user may specify that the system should create a specified number of base models (e.g., 100 base models) and that the base models may be of one or more selected types of machine learning classification models (e.g., 50 gradient boosted tree method models and 50 logistic regression models), and then the training system 220 may generate and train the specified models as described below in blocks 112 and 114.

According to some embodiments, each machine learning base model may be a logistic regression model, a gradient boosted tree method model, a k-nearest neighbor model, any other such suitable type of machine learning model as desired by a use, or combinations thereof. In some embodiments, all of the machine learning base models may be a gradient boosted tree method model. For example, the training system 220 may include a default type of machine learning classification model for the base models and in some embodiments, the default type machine learning base model may be a gradient boosted tree method model for all base models.

In some embodiments, instead of a user input number of base models, the training system 220 may utilize a default method of determining a number of base models to create that is based on an amount of majority cases and minority cases in the training data. In some embodiments, the default method may include identifying a number of base models that are approximately equivalent to the number of majority cases divided by the number of minority cases present in the training data. Thus, for example, if the training data includes 100,000 majority cases and 100 minority cases, then the training system 220 may determine that a number of machine learning base models to generate is 100. In this way, the training system 220 can create a number of base models that can each be trained on an approximately equal amount of training data (e.g., each model can be trained using the 100 minority cases and a different set of 100 majority cases).

In block 112, the training system 220 may determine a chunk for a machine learning base model of the machine learning base models. According to some embodiments, a "chunk" may refer to an amount of a unique subset of the training data that is to be used to train a particular one of the specified number of machine learning base models to be generated. In other words, in each base model may be trained using a chunk of training data that corresponds to a different subset of training data. However, as described herein, each subset of training data used to train each respective base model of a plurality of base models may include the same data corresponding to minority cases but different data corresponding to different majority cases of the training data. In some embodiments, each chunk may be no more than 50% minority cases.

As alluded to above, according to some embodiments, a chunk may include all minority cases from the training data and a plurality of majority cases from the training data. Thus, each chunk may include data associated with the same group of minority cases (which may correspond to all minority cases of the first dataset minus a set of minority cases that have been set aside to use as testing data) and data corresponding to a different group of majority cases of the training data. In other words, each base model can be trained using the same set of minority cases mixed with a different set of majority cases. Thus, each base model can be trained using all of the same minority cases and a different set of the majority cases. In this way, each of all of the majority cases of the training data may be used to train one base model, ensuring that all of the majority cases of the training data are taken into account during training. However, by including all of the minority cases of the training data in the training of each base model of the plurality of base models, the training system 220 provides a more balanced dataset to train each model and ensures that each model has exposure to minority cases during training. This allows each model to better identify minority cases in previously unseen data and allows the machine learning models to be trained faster using a memory of a typical laptop or desktop computer so that expensive cloud computing resources are not required.

This is advantageous over other methods that, by contrast, may involve randomly splitting up all of the original dataset for use in training different base models, in which case it would be likely that a large number of base models would be trained using subsets of data that have no minority cases at all, thereby rendering those models useless. However, the techniques described herein allow each model to be exposed to minority and majority cases during training, which may result in more accurate results.

According to some embodiments, determining the chunk for a machine learning base model of the machine learning base models may be conducted dynamically at runtime (i.e., when the data is loaded into internal memory to train the model(s)). However, determining the size of the chunk may be done in advance of runtime. For example, if the training data represents 10,100 cases, where 100 cases are minority cases and 10,000 cases are majority cases, prior to runtime, the training system 220 may determine that there will be 100 base models and each of the 100 base models will be trained with a different chunk of data representing 200 cases (e.g., each chunk represents the 100 minority cases mixed with a different group of 100 majority cases). However, although the training system 220 may determine that a given base model will be trained using data that includes a set of 100 majority cases, the particular 100 majority cases of the 10,000 majority cases of the training data may be not be selected by the training system 220 until runtime, at which point the training system 220 may randomly select data corresponding to 100 of the 10,000 majority cases that have not already been used to train another base model to train the particular model. Thus, according to some embodiments, determining a chunk for a machine learning base model of the machine learning based models can include, at runtime, selecting data corresponding to all of the minority cases and a portion of the majority cases of the training data that have not already been used to train another base model as the chunk. Determining the particular data that will be used to train the base models may occur at runtime because training the base models may be done in a loop, where the training data chunks can be simultaneously determined. In some embodiments, determining the particular data that will be used to train the base models at runtime may save memory in runtime. According to some embodiments, selection of the particular data may be performed prior to runtime if enough memory is available to do so.

In block 114, the training system 220 may train the machine learning base model with the chunk. Each base model can be trained using the corresponding chunk of training data. As stated above, according to some embodiments, each base model may be trained using a respective chunk that includes data corresponding to the same set of minority cases and a different set of majority cases of the training data. According to some embodiments, the number of minority cases and number of majority cases represented by a chunk may be approximately equal. In some embodiments, the number of majority cases represented by a chunk may be greater than the number of minority cases.

According to some embodiments, the training system 220 may validate the machine learning base models after they are trained. In other words, in some embodiments, the training system 220 may validate the ensemble of base models by inputting the minority portion of the first dataset (i.e., the testing data) into each base model, receiving a prediction/classification output from each base model, and then aggregating all of the outputs of the base models to determine classifications for each case in the testing data to determine whether the ensemble of base models is able to properly classify previously unseen data with a specified level of accuracy (e.g., greater than 50%). Thus, in some embodiments, each base model may be trained using a different set of training data but tested using the same set of testing data. The specified level of accuracy may differ based on the particular classification problem being addressed, as in some difficult cases, a 10% success rate may be considered to be good, whereas in other easier classification problems anything less than 90% may be considered to be bad. In some embodiments, a minimum level of accuracy for the ensemble of base models may be set by a user. According to some embodiments, validation may include that determining an accuracy ratio of the ensemble of base models is above a specified threshold, where the accuracy ratio represents a percentage of correct classifications of testing data divided by a percentage of correct classifications of training data. In other words, if the ensemble of base models is 99% accurate in classifying the training data but only 3% accurate in classifying the testing data, then the ensemble of trained base models is overfit, meaning that it cannot successfully classify data that is not virtually identical to the training data. Generally, it is desirable that the ensemble of base models can classify new data (such as the testing data) at around the same level of success as the training data, and thus an accuracy ratio of 1 is desirable. According to some embodiments, the trained ensemble of base models may be considered to be validated if the accuracy ratio is above a user selected threshold (e.g., at least 80%), which, as previously described above, may vary greatly based on the difficulty of the classification problem. According to some embodiments, if a the ensemble of base models fails the validation, then the training system 220 may retrain each of the machine learning base models by training the model using more or less iterations, including more data in the training data chunks (e.g., creating larger chunks that include some overlap in majority cases between the chunks), tuning hyperparameters, increasing/decreasing regularization on the model, and/or providing the model with some constraints to make it less flexible.

In block 116, the training system 220 may determine whether all base models of the machine learning base models are trained. According to some embodiments, the training system 220 may iteratively perform blocks 112 and 114 for each machine learning base model of the machine learning base models until all machine learning base models are trained. According to some embodiments, each base model may be sequentially trained and stored by user device 302. By training each base model in sequence, training chunks can be selected that fit into memory one at a time for the purpose of training a single base model, so that the memory is not overloaded. Once training of a particular base model is completed, the training data is cleared from memory and the next subset/chunk of training data is loaded into memory to train the next base model.

Once all of the machine learning base models are trained, they can be used as an ensemble to classify new datapoints or cases. According to some embodiments, data representing a new case (e.g., a new transaction) can be submitted to each base model of the ensemble and each base model of the ensemble can perform a prediction or classification of the new case. All of these outputs can be aggregated into one final classification output that is then returned to the user. As will be understood by those of skill in the art, this process can be known as "bootstrap aggregating," also known as "bagging." where "bootstrapping" refers to the process of creating a plurality of training datasets from an original dataset for training of an ensemble of machine learning classification models and "aggregating" refers to combining the classification results of the ensemble of base models to generate a single ensemble classification that is the final output of the classification process. Because each base model is trained on a different subset of the training data, each base model may be capable of generating different insights, and each may have different strengths and weaknesses. Use of bagging can help reduce variance and overfitting and improve the stability and accuracy of the overall model. According to some embodiments the results of each base model can be aggregated by voting or majority rule. In other words, if more than 50% of the base models determine the classification of a new datapoint is that of a minority case, then the ensemble classification will determine that the new datapoint is to be classified as a minority case. In some embodiments, the results of each base model can be aggregated using soft voting, which takes an average of predictions and determines whether the average is above a specified threshold. As will be appreciated by those of skill in the art, the specified threshold utilized in a soft voting scheme of an ensemble model is a parameter that can be adjusted based on the training of the ensemble model. For example, the specified threshold for a soft vote may start out at 50% and over the course of training may be modified to be, for example, 24%.

Figure 2:
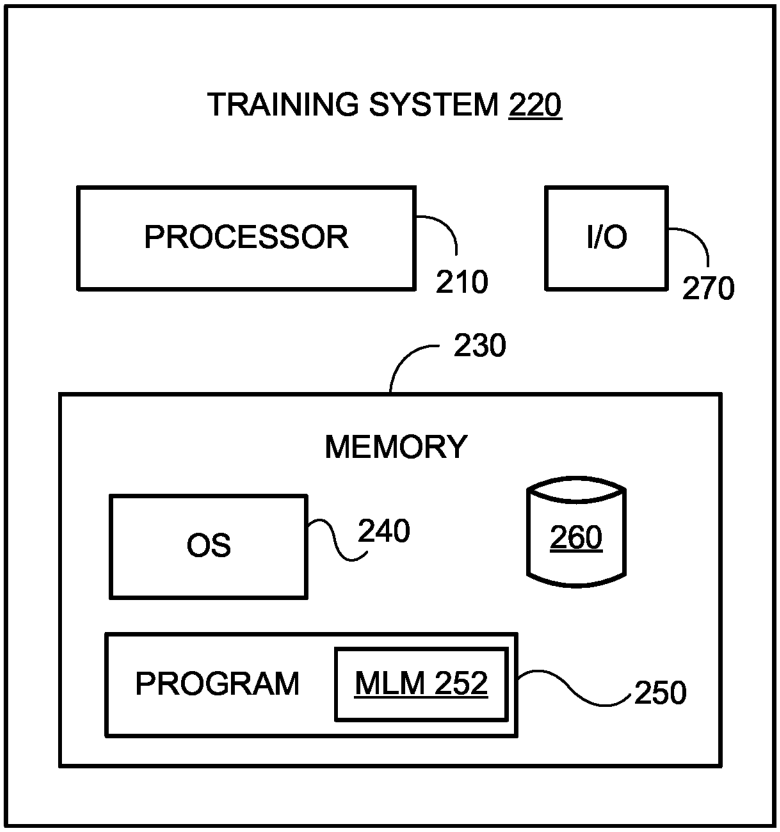
FIG. 2 is block diagram of an example training system used to provide bagging ensemble classifiers for imbalanced big data, according to an example implementation of the disclosed technology.
Figure 3:
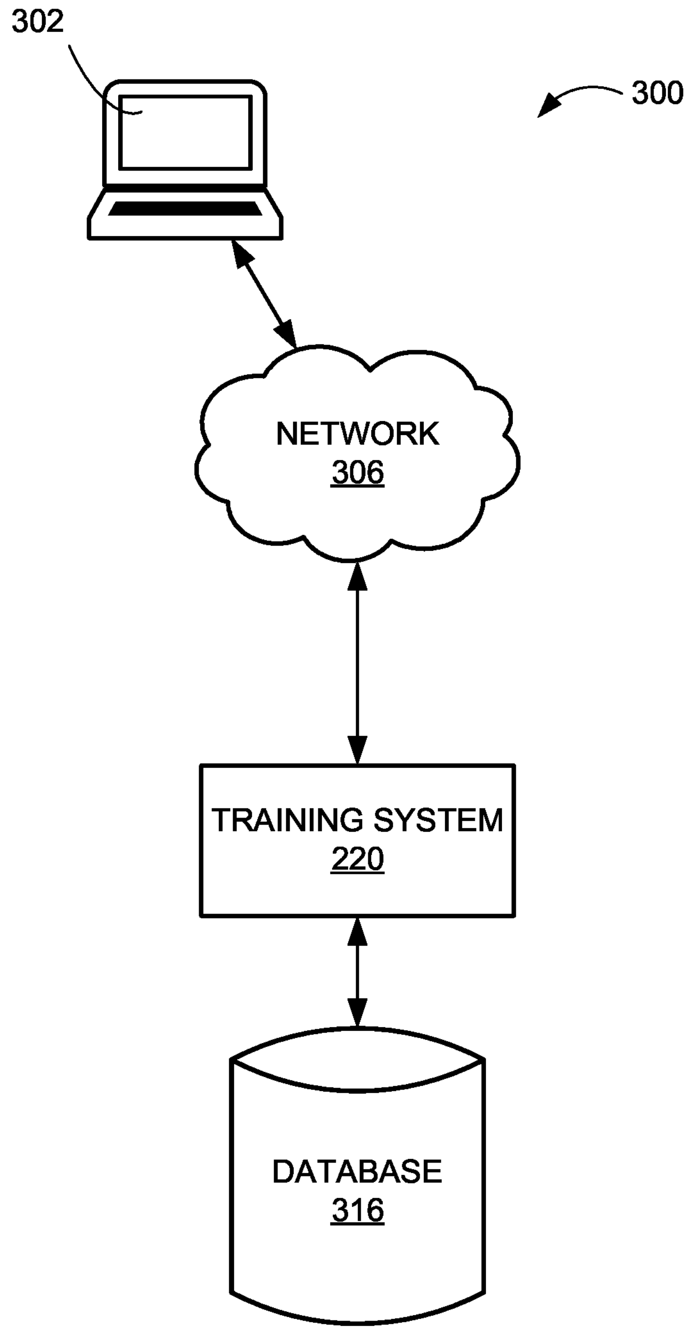
FIG. 3 is block diagram of an example system that may be used to provide bagging ensemble classifiers for imbalanced big data, according to an example implementation of the disclosed technology.

FIG. 2 is a block diagram of an example training system 220 that may train an ensemble classifier model using a large set of imbalanced data on a local device, such as a desktop or laptop computer. The training system 220 may be used to split the imbalanced dataset into testing data and training data, and then further split the training data into chunks that are used to separately train a plurality of machine learning classification base models that are then validated using the testing data according to an example implementation of the disclosed technology. According to some embodiments, the user device 302, as depicted in FIG. 3 and described below, may have a similar structure and components that are similar to those described with respect to training system 220 shown in FIG. 2. As shown, the training system 220 may include a processor 210, an input/output (I/O) device 270, a memory 230 containing an operating system (OS) 240 and a program 250 having one or more machine learning models (MLMs) 252. In some embodiments, program 250 may include a plurality of MLMs 252 that may be trained, for example, to perform ensemble classifications of newly introduced data. In certain implementations, a MLM 252 may issue commands in response to processing an event, in accordance with a model that may be continuously or intermittently updated. Moreover, processor 210 may execute one or more programs (such as via a rules-based platform or the trained MLM(s) 252), that, when executed, perform functions related to disclosed embodiments.

In certain example implementations, the training system 220 may be a single server or may be configured as a distributed computer system including multiple servers or computers that interoperate to perform one or more of the processes and functionalities associated with the disclosed embodiments. In some embodiments training system 220 may be one or more servers from a serverless or scaling server system. In some embodiments, the training system 220 may further include a peripheral interface, a transceiver, a mobile network interface in communication with the processor 210, a bus configured to facilitate communication between the various components of the training system 220, and a power source configured to power one or more components of the training system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig- Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the training system 220 may include one or more storage devices configured to store information used by the processor 210 (or other components) to perform certain functions related to the disclosed embodiments. In one example, the training system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The training system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the training system 220 may include the memory 230 that may include one or more programs 250 to perform one or more functions of the disclosed embodiments. For example, in some embodiments, the training system 220 may additionally manage dialogue and/or other interactions with the customer via a program 250.

The processor 210 may execute one or more programs 250 located remotely from the training system 220. For example, the training system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a training system database 260 for storing related data to enable the training system 220 to perform one or more of the processes and functionalities associated with the disclosed embodiments. According to some embodiments, the training system database 260 may be a secondary or external storage that can allow the training system 220 to store a large amount of data. According to some embodiments, the training system database 260 may be configured to store all or a portion of a large imbalanced dataset. In cases, where the training system database 260 cannot store the entirety of the large imbalanced dataset, then some or all of the large imbalanced dataset may be stored on an external hard drive (e.g., databased 316) that can be accessed by the training system 220.

The training system database 260 may include stored data that includes training and/or testing datasets to be used in the training and/or testing of machine learning models. The training system database 260 may also include stored data that includes unclassified data that is to be classified using one or more machine learning models of the training system 220. According to some embodiments, the functions provided by the training system database 260 may also be provided by a database that is external to the training system 220, such as the database 316 as shown in FIG. 3.

The training system 220 may also be communicatively connected to one or more memory devices (e.g., databases) locally or through a network. The remote memory devices may be configured to store information and may be accessed and/or managed by the training system 220. By way of example, the remote memory devices may be document management systems, Microsoft™ SQL database, Share- Point™ databases, Oracle™ databases, Sybase™ databases, or other relational or non-relational databases. Systems and methods consistent with disclosed embodiments, however, are not limited to separate databases or even to the use of a database.

The training system 220 may also include one or more I/O devices 270 that may comprise one or more interfaces for receiving signals or input from devices and providing signals or output to one or more devices that allow data to be received and/or transmitted by the training system 220. For example, the training system 220 may include interface components, which may provide interfaces to one or more input devices, such as one or more keyboards, mouse devices, touch screens, track pads, trackballs, scroll wheels, digital cameras, microphones, sensors, and the like, that enable the training system 220 to receive data from a user (such as, for example, via the user device 302).

In examples of the disclosed technology, the training system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The training system 220 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The training system 220 may be configured to adjust model parameters during training. Model parameters may include weights, coefficients, offsets, or the like. Training may be supervised or unsupervised.

The training system 220 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The training system 220 may be configured to optimize statistical models using known optimization techniques.

Furthermore, the training system 220 may include programs configured to retrieve, store, and/or analyze properties of data models and datasets. For example, training system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The training system 220 may include algorithms to determine a data type, key-value pairs, row-column data structure, statistical distributions of information such as keys or values, or other property of a data schema may be configured to return a statistical profile of a dataset (e.g., using a data-profiling model). The training system 220 may be configured to implement univariate and multivariate statistical methods. The training system 220 may include a regression model, a Bayesian model, a statistical model, a linear discriminant analysis model, or other classification model configured to determine one or more descriptive metrics of a dataset. For example, training system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The training system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, training system 220 may be configured to generate a similarity metric representing a measure of similarity between data in a dataset. A similarity metric may be based on a correlation, covariance matrix, a variance, a frequency of overlapping values, or other measure of statistical similarity.

The training system 220 may be configured to generate a similarity metric based on data model output, including data model output representing a property of the data model. For example, training system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The training system 220 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The training system 220 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, training system 220 is configured to generate and/or train a classification model to classify a dataset, consistent with disclosed embodiments.

The training system 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the training system may analyze information applying machine-learning methods.

While the training system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the training system 220 may include a greater or lesser number of components than those illustrated.

FIG. 3 is a block diagram of an example system 300 that includes a user device 302 that may be used to view and interact with training system 220, according to an example implementation of the disclosed technology. The components and arrangements shown in FIG. 3 are not intended to limit the disclosed embodiments as the components used to implement the disclosed processes and features may vary. As shown, training system 220 may interact with a user device 302 via a network 306. In certain example implementations, the training system 220 may include a database 316.

In some embodiments, a user may operate the user device 302. The user device 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the training system 220. In some embodiments, the user device 302 may include or incorporate electronic communication devices for hearing or vision impaired users.

Users may include individuals such as, for example, data scientists, engineers, managers or other employees of an entity associated with an organization, who may intend to develop machine learning classification models on a user device 302 using the training system 220. According to some embodiments, the user device 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The training system 220 may include programs (scripts, functions, algorithms) to configure data for visualizations and provide visualizations of datasets and data models on the user device 302. This may include programs to generate graphs and display graphs. The training system 220 may include programs to generate histograms, scatter plots, time series, or the like on the user device 302. The training system 220 may also be configured to display properties of data models and data model training results including, for example, architecture, loss functions, cross entropy, activation function values, embedding layer structure and/or outputs, convolution results, node outputs, or the like on the user device 302.

The network 306 may be of any suitable type, including individual connections via the internet such as cellular or WiFi networks. In some embodiments, the network 306 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The training system 220 may be associated with and optionally controlled by one or more entities such as a business, corporation, individual, partnership, or any other entity that provides one or more of goods, services, and consultations to individuals such as customers. In some embodiments, the training system 220 may be controlled by a third party on behalf of another business, corporation, individual, partnership. The training system 220 may include one or more servers and computer systems for performing one or more functions associated with products and/or services that the organization provides, such as for example, generating machine learning models to detect fraudulent transactions, to determine whether an existing customer is likely to apply for a new credit card, to determine whether a client is likely to go out of business this year, to determine whether a new email is a phishing attempt, to determine whether a specific marketing email is likely to convert a customer, and or a variety or other such functionalities.

The training system 220 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 302 may be able to access training system 220 using the cloud computing environment. User device 302 may be able to access training system 220 using specialized software. The cloud computing environment may eliminate the need to install specialized software on user device 302.

In accordance with certain example implementations of the disclosed technology, the training system 220 may include one or more computer systems configured to compile data from a plurality of sources such as the training system 220, the user device 302 and/or the database 316. The training system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF. JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered." for example, a group of datasets may share common features, such as overlapping data, shared statistical properties, or the like. Clustered datasets may share hierarchical relationships (e.g., data lineage).

According to some embodiments, the training system 220 may be configured to receive one or more user inputs from a user via user device 302. The user inputs may include a specified number of base models to be created, a specification of the types of classification models to be used for the base models, or a combination of both. For example, user device 302 may include a software application that interfaces with the training system 220. According to some embodiments, the training system 220 may be embodied in as software that runs on user device 302.

The training system 220 may store a large dataset, such as a large imbalanced dataset in a training system database 260 or via an external memory/database 316 that is accessible by the training system 220. According to some embodiments, the training system 220 may be configured to identify minority and majority cases, for example, based on the labeling of the dataset. A case may refer to a subset of data relating to a particular object or instance, such as for example, all data relating to a particular transaction. Minority and majority cases can refer to a classification of a case as either being in a minority class or a majority class. For instance, in the example in which cases refer to transactions and the classifications relate to identifying whether a transaction is fraudulent or legitimate, if most transactions of the dataset are legitimate then cases of legitimate transactions will be considered to be majority cases, whereas cases of fraudulent transactions will be considered to be minority cases. An imbalanced dataset can be one where most of the cases are majority cases and only a very small number are minority cases, thereby reflecting the imbalance.

According to some embodiments, the training system 220 may then split each of the classes (i.e., the majority class and the minority class) into training data and testing data. For example, if there are 10,000 cases of legitimate transactions (i.e., majority cases) and 100 cases of fraudulent transactions (i.e., minority cases), the training system 220 may allocate a specified percentage of data for testing purposes, such as 10%, in which case, the training system 220 may set aside 1000 cases of legitimate transactions and 10 cases of fraudulent transactions to later use as testing data. The remaining data (i.e., 9000 cases of legitimate transactions and 90 cases of fraudulent transactions can then be used by the training system 220 as training data to train a plurality of base models of an ensemble classifier.

The training system 220 may determine a number of base models to create either based on a default method or based on a user input. According to some embodiments, the default method may be to generate a number of base models equivalent to the number of majority cases divided by the number of minority cases and rounded to the nearest whole number. Thus, in the prior example, the default method would result in the creation of 100 base models from dividing 9000 majority cases by 90 minority cases. Each base model can then be trained using all of the minority cases mixed with a unique chunk of the majority cases. Thus, in the preceding example, each base model would be trained using a data set that includes the 90 minority cases and a set of 90 majority cases. In this way, the default method can train the base models using balanced data to better allow the models to identify the rare minority cases more accurately when they occur in the real world. This method also ensures that all of the majority cases are used in the training of a base model of the plurality of the base models, so no information is lost in the process. According to some embodiments, the training system 220 may select a number of base models based on a user input. For example, a user may indicate that they want the system to generate 50 base models. In this case, the training system 220 may then determine an amount of training data for each base model by dividing the number of majority cases by the specified number of models and adding that amount of majority cases to the minority cases. For instance, utilizing 50 base models in the previous example would mean that the training system 220 would divide the 9000 majority cases by 50, resulting in 180 majority cases per base model. Thus, in this case, each base model would then be trained with a unique subset of training data that is made up of the 90 minority cases and 180 majority cases. Although these subsets still have a 2-1 imbalance between majority and minority cases, this ratio is still significantly less imbalanced than the original 10-1 imbalance of the original dataset.

According to some embodiments, a user may specify one or more types of the base models to be used. For example, a user may specify that one or more base models will be a logistic regression model, a gradient boosted tree method model, a k-nearest neighbors model or any other type of machine learning model that is configured to perform classifications of data. For example, if there will be 100 base models, a user may specify that they want 50 base models to be gradient boosted tree method models, 30 models to be logistic regression models and 20 models to be k-nearest neighbors models. According to some embodiments, the training system 220 may default to use of a particular type of classification model for each base model, such as for example, the gradient boosted tree method model.

Once the number and type of base models are determined, along with an identification of the amount and types (i.e., amount of each class type) of data to be used in training the models, the training system 220 may train the models using conventional machine learning model training techniques. Each base model can be trained independently of the others, such that they can be trained in sequence or with a limited number being trained in parallel based on the processing power of the user device 302 or other device that contains the training system 220. According to some embodiments, the exact data that is used to train each particular model may be selected by the training system 220 at runtime. In other words, while the training system 220 may have determined that a given model will be trained using 90 majority cases, the training system 220 may not identify exactly which 90 majority cases of the 9,000 majority cases to use to train a model until they are randomly selected at runtime (i.e., at the time of training the models). According to some embodiments, as data associated with majority cases is selected and used to train a given base model, that data will be eliminated from consideration for the training of the remaining base models. This can ensure that all of the data relating to the majority cases will be used to train one of the plurality of base models. As described previously, the data associated with the minority cases of the training data will be used repeatedly to train each based model of the plurality of base models, along with data associated with a unique subset of the majority cases of the training data.

According to some embodiments, after each base model is trained, the training system 220 may validate the ensemble of base models using the testing data. For instance, in the example described previously above, the training system 220 set aside 10% of the original dataset to be used as training data, corresponding to 1,000 legitimate transactions (i.e., majority cases) and 10 fraudulent transactions (i.e., minority cases). In some embodiments, the training system 220 may input this testing data into each base model and aggregate the outputs of each to determine how well the ensemble of base models can properly identify and classify the 10 minority cases. According to some embodiments, all of the testing data will be input into each base model to generate an output, however, if the testing data is too large to fit into memory all at once, the testing data may be split into subsets that are all input into each base model to carry out the testing. Each base model will generate predictions about the test cases and their predictions will be aggregated by the training system 220 and compared to a threshold to determine whether the ensemble of base models meets a minimum level of desired accuracy. In some embodiments, the training system 220 may validate that the ensemble of trained base models is not overfit and/or performs at a desired minimum level of accuracy by, for example, determining whether there is a significant difference between the prediction accuracy based on the training data versus prediction accuracy based on the testing data. In general, it may be desired that the testing accuracy of the ensemble of base models should be close to, but slightly lower than the training accuracy of the ensemble. If it's far below but the training accuracy is high, that indicates that the model is overfit and it is in essence memorizing the training data rather than extracting general trends from it. If the ensemble model is not performing to a minimal level of desired accuracy, in some embodiments each of the base models may be retrained using, for example larger chunks of data, if possible.

After all the ensemble of base models have been trained and validated, the training system 220 may use the ensemble of models to classify new data/cases. For example, if it is desired to know whether a new transaction is predicted to be fraudulent or not, the data for the new transaction can be submitted to each and all of the base models of the ensemble and the results of each model can be aggregated into one final result that provides a classification (i.e., fraudulent or legitimate) of the new transaction. As previously described above, in some embodiments the results can be aggregated using, for example, majority rule voting or soft voting that aggregates average predictions of the models. In this way, the training system 220 can be used to train an ensemble classifier using a large imbalanced dataset, in a manner that uses fewer computing resources such that it may be performed on a typical personal computing device.

Although the preceding description describes various functions of a training system 220, a user device 302 and a database 316, in some embodiments, some or all of these functions may be carried out by a single computing device.

Example Use Case

The following example use case describes an example of a typical user flow pattern. This section is intended solely for explanatory purposes and not in limitation.

In one example, a data scientist may want to create a machine learning model that can predict whether a given transaction is a fraudulent transaction or not based on a training dataset that is large and unbalanced. For example, the training dataset may be data relating to 100,000 previous transactions in which only 100 of the transactions were fraudulent transactions (i.e., minority cases) and 99,900 of the previous transactions were legitimate (i.e., majority cases). The data scientist may want to create the classification model using their laptop (e.g., user device 302), without having to engage expensive outside computing resources, such as cloud computing resources. However, because the dataset is so large, the data scientist's laptop does not have enough primary memory capacity to train a model using all of the training data. Fortunately, the data scientist can use the disclosed system (e.g., training system 220) to train a plurality of base models that can then use bagging to classify new transactions based on the results of the plurality of base models. The system will automatically reconfigure the training data for use in training a number of base models. The number of based models used can may be selected by a user and the system will automatically divide the negative cases into chunks corresponding to the selected number. For example, if the user selects 10, then the system will (at runtime) split the negative cases into chunks of 9,990 cases and each chunk will be used in addition with the minority cases to separately train and test 10 base models. Alternatively, the system can determine the number of base models to use by training models with an approximately equal number of majority and minority cases. Thus, for example, in this case the system may determine that 100 base models will be used. The system may also separate out some portion of the training data that is not used to train the base models but is rather used to test the base models to ensure they can make effective classifications. Once all of the base models are trained, the user can submit new data to be classified by the system and the system will run the new test data through all of the base models and aggregate the results and output a classification of the new test data to the user based on the aggregated results of the base models.

In some examples, disclosed systems or methods may involve one or more of the following clauses:

Clause 1: A system, comprising: one or more processors; and a memory in communication with the one or more processors and storing instructions that, when executed by the one or more processors, are configured to cause the system to: receive a first dataset; store a minority portion of the first dataset as testing data with the remaining first data as training data; separate the training data into majority cases and minority cases; receive user input comprising a number of machine learning base models to generate; generate the machine learning base models based on the user input; iteratively for each machine learning base model of the machine learning base models until all machine learning base models are trained: determine a chunk for a machine learning base model of the machine learning base models, wherein the chunk comprises all minority cases from the training data and a plurality of majority cases from the training data, and train the machine learning base model with the chunk; and validate the machine learning base models using the testing data.

Clause 2: The system of clause 1, wherein each chunk comprises no more than 50% minority cases.

Clause 3: The system of clause 1, wherein the minority portion comprises 10 to 30% of the first dataset.

Clause 4: The system of clause 1, wherein each machine learning base model comprises a gradient boosted tree method model.

Clause 5: The system of clause 1, wherein each machine learning base model comprises a logistic regression model, a gradient boosted tree method model, a k-nearest neighbor model, or combinations thereof.

Clause 6: The system of clause 1, wherein the user input further comprises a selection of a logistic regression model, a gradient boosted tree method model, or a k-nearest neighbor model.

Clause 7: The system of clause 1, wherein determining the chunk for a machine learning base model of the machine learning base models is conducted dynamically at runtime.

Clause 8: A system, comprising: one or more processors; and a memory in communication with the one or more processors and storing instructions that, when executed by the one or more processors, are configured to cause the system to: receive user input comprising a number of machine learning base models to generate; generate the machine learning base models based on the user input; iteratively for each machine learning base model of the machine learning base models until all machine learning base models are trained: determine a chunk for a machine learning base model of the machine learning base models, wherein the chunk comprises all minority cases from training data and a plurality of majority cases from the training data; and train the machine learning base model with the chunk.

Clause 9: The system of clause 8, wherein each chunk comprises no more than 50% minority cases.

Clause 10: The system of clause 8, further configured to validate the machine learning base models.

Clause 11: The system of clause 8, wherein each machine learning base model comprises a gradient boosted tree method model.

Clause 12: The system of clause 8, wherein each machine learning base model comprises a logistic regression model, a gradient boosted tree method model, a k-nearest neighbor model, or combinations thereof.

Clause 13: The system of clause 8, wherein the user input further comprises a selection of a logistic regression model, a gradient boosted tree method model, or a k-nearest neighbor model.

Clause 14: The system of clause 8, wherein determining the chunk for a machine learning base model of the machine learning base models is conducted dynamically at runtime.

Clause 15: A system, comprising: one or more processors; and a memory in communication with the one or more processors and storing instructions that, when executed by the one or more processors, are configured to cause the system to: receive training data separated into majority cases and minority cases; generate machine learning base models based on an amount of majority cases and minority cases; iteratively for each machine learning base model of the machine learning base models until all machine learning base models are trained: determine a chunk for a machine learning base model of the machine learning base models, wherein the chunk comprises all minority cases from the training data and a plurality of majority cases from the training data; and train the machine learning base model with the chunk.

Clause 16: The system of clause 15, wherein each chunk comprises no more than 50% minority cases.

Clause 17: The system of clause 15, further configured to validate the machine learning base models.

Clause 18: The system of clause 15, wherein each machine learning base model comprises a gradient boosted tree method model.

Clause 19: The system of clause 15, wherein each machine learning base model comprises a logistic regression model, a gradient boosted tree method model, a k-nearest neighbor model, or combinations thereof.

Clause 20: The system of clause 15, wherein determining the chunk for a machine learning base model of the machine learning base models is conducted dynamically at runtime.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms “component,” “module,” “system,” “server,” “processor,” “memory.” and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IOT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations." "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a." "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:

one or more processors; and a memory in communication with the one or more processors and storing instructions that, when executed by the one or more processors, are configured to cause the system to:

receive a first dataset;

store a minority portion of the first dataset as testing data and a remaining portion of the first dataset as training data;

separate the training data into majority cases and minority cases;

receive user input comprising a number of machine learning base models to generate;

generate a plurality of machine learning base models corresponding to the number based on the user input;

iteratively for each machine learning base model of the plurality of machine learning base models until all machine learning base models of the plurality of machine learning base models are trained:

determine a chunk for a machine learning base model of the plurality of machine learning base models, wherein the chunk comprises all minority cases from the training data and a subset of majority cases from the training data that is unique from other chunks associated with other machine learning base models of the plurality of machine learning base models; and train the machine learning base model with the chunk; and validate the plurality of machine learning base models using the testing data, wherein at least a first subset of majority cases of a first chunk associated with a first machine learning base model and a second subset of majority cases of a second chunk associated with a second machine learning base model comprise an overlap of one or more majority cases such that the first chunk and second chunk both comprise the one or more majority cases.

2. The system of claim 1, wherein each chunk comprises no more than 50% minority cases.

3. The system of claim 1, wherein the minority portion comprises 10 to 30% of the first dataset.

4. The system of claim 1, wherein each machine learning base model comprises a gradient boosted tree method model.

5. The system of claim 1, wherein each machine learning base model comprises a logistic regression model, a gradient boosted tree method model, a k-nearest neighbor model, or combinations thereof.

6. The system of claim 1, wherein the user input further comprises a selection of a logistic regression model, a gradient boosted tree method model, or a k-nearest neighbor model.

7. The system of claim 1, wherein determining the chunk for a machine learning base model of the plurality of machine learning base models is conducted dynamically at runtime.

8. The system of claim 1, wherein each majority case of the majority cases of training data is incorporated into at least one subset of majority cases associated with a chunk such that none of the majority cases of training data are excluded from training at least one machine learning base model of the plurality of machine learning base models.

9. The system of claim 1, wherein the plurality of machine learning base models are trained sequentially by loading a first chunk into a training memory, performing training using the first chunk, and clearing the first chunk from the training memory before loading a next chunk into the training memory and wherein a chunk size is determined so as to not exceed a size of the training memory.

10. A system, comprising:

one or more processors; and a memory in communication with the one or more processors and storing instructions that, when executed by the one or more processors, are configured to cause the system to:

receive user input comprising a number of machine learning base models to generate;

generate a plurality of machine learning base models corresponding to the number based on the user input;

iteratively for each machine learning base model of the plurality of machine learning base models until all machine learning base models of the plurality of machine learning base models are trained:

determine a chunk for a machine learning base model of the plurality of machine learning base models, wherein the chunk comprises all minority cases from training data and a subset of majority cases from the training data that is unique from other chunks associated with other machine learning base models of the plurality of machine learning base models; and train the machine learning base model with the chunk, wherein at least a first subset of majority cases of a first chunk associated with a first machine learning base model and a second subset of majority cases of a second chunk associated with a second machine learning base model comprise an overlap of one or more majority cases such that the first chunk and second chunk both comprise the one or more majority cases.

11. The system of claim 10, wherein each chunk comprises no more than 50% minority cases.

12. The system of claim 10, wherein the instructions, when executed by the one or more processors, are further configured to cause the system to validate the plurality of machine learning base models.

13. The system of claim 10, wherein each machine learning base model comprises a gradient boosted tree method model.

14. The system of claim 10, wherein each machine learning base model comprises a logistic regression model, a gradient boosted tree method model, a k-nearest neighbor model, or combinations thereof.

15. The system of claim 10, wherein the user input further comprises a selection of a logistic regression model, a gradient boosted tree method model, or a k-nearest neighbor model.

16. The system of claim 10, wherein determining the chunk for a machine learning base model of the plurality of machine learning base models is conducted dynamically at runtime.

17. A system, comprising:

one or more processors; and a memory in communication with the one or more processors and storing instructions that, when executed by the one or more processors, are configured to cause the system to:

receive training data separated into majority cases and minority cases;

generate a plurality of machine learning base models based on an amount of majority cases and minority cases;

iteratively for each machine learning base model of the plurality of machine learning base models until all machine learning base models of the plurality of machine learning base models are trained:

determine a chunk for a machine learning base model of the plurality of machine learning base models, wherein the chunk comprises all minority cases from the training data and a subset of majority cases from the training data that is unique from other chunks associated with other machine learning base models of the plurality of machine learning base models; and train the machine learning base model with the chunk, wherein at least a first subset of majority cases of a first chunk associated with a first machine learning base model and a second subset of majority cases of a second chunk associated with a second machine learning base model comprise an overlap of one or more majority cases such that the first chunk and second chunk both comprise the one or more majority cases.

18. The system of claim 17, wherein each chunk comprises no more than 50% minority cases.

19. The system of claim 17, wherein the instructions, when executed by the one or more processors, are further configured to cause the system to validate the plurality of machine learning base models.

20. The system of claim 17, wherein determining the chunk for a machine learning base model of the plurality of machine learning base models is conducted dynamically at runtime.

* * * * *